United States Patent [19]
Tryon

[11] 3,707,798
[45] Jan. 2, 1973

[54] DECOY

[76] Inventor: Ned A. Tryon, Kent Island, Chester, Md. 21619

[22] Filed: Dec. 31, 1970

[21] Appl. No.: 103,147

[52] U.S. Cl. .......................................................43/3
[51] Int. Cl. ..............................................A01m 31/06
[58] Field of Search..........................43/2, 3, 42.33

[56] References Cited

UNITED STATES PATENTS

| 1,298,361 | 3/1919 | Levy | 43/3 |
|---|---|---|---|
| 3,528,189 | 9/1970 | Lilley, Jr. | 43/42.33 |
| 1,062,713 | 5/1913 | Johnson | 43/3 |
| 2,933,847 | 4/1960 | Frasure | 43/42.33 |
| 3,186,120 | 6/1965 | Layson | 43/2 |

Primary Examiner—Warner H. Camp
Attorney—Frank P. Cyr

[57] ABSTRACT

A goose decoy comprising a form upon which is mounted a color photoreproduction of an actual goose.

3 Claims, 3 Drawing Figures

PATENTED JAN 2 1973          3,707,798

INVENTOR
NED A. TRYON

BY *Fred P. Cyr*
ATTORNEY

DECOY

BACKGROUND OF THE INVENTION

As is well known, the hunter resorts to many ways to lure the prey to a location sufficiently close to himself to thus enable him to use his firearm to effect a kill of the prey. Such prior devices have included calls, a noise emitting device designed to imitate the vocal utterances of the prey, whereas in other instances, decoys which are designed to simulate the appearance of the prey are employed and planted or set at designated areas with the hopes that the prey, in this instance, a goose flying thereover, will be lured down towards the decoy thinking that the decoy is actually a goose which is at a feeder location. Usually, when decoys are deployed in an area, some of the decoys are used to depict a goose or duck sitting on the water or land, whereas in other instances, the decoys are used to show a goose or duck in a feeding position. As can be appreciated, with geese flying overhead, they will be attracted to the decoys which have been deployed in an area, but as is common knowledge, a goose or duck is a cunning bird and unless the decoys actually depict a real goose or duck, the flying bird may, at recognizing the fakeness, veer off or continue to fly to some outward distance much to the disgust of the hunter. Possibly, one of the main reasons why decoys do not attract the geese or ducks is that when the birds descend and come reasonably close to the decoys, they quickly realize that the decoys are not actual birds and fly away. Decoys usually are of a silhouette type or are formed with a full body to simulate a goose or duck. Of course, the silhouette type decoy is preferable as the same may be easily constructed and assembled at site and is usually of the knock-down type which makes for the easy storage of the decoy when not in use, whereas the full body type decoy is cumbersome to handle and also poses some problems for storage when not in use.

With the above in mind, it is the primary object of the invention to provide a goose or duck decoy with a means whereby the same will present a lifelike appearance to the geese or ducks to thus increase the efficiency thereof in luring geese or ducks to a position in close proximity to the already deployed decoys.

Another object of the invention is to provide a decoy, whether it be one to simulate a goose or duck, with a true life appearance by applying to the silhouette a color photoreproduction of the goose or duck to thereby increase the efficiency thereof in luring flying birds to their place of deployment, which is usually in firing range of the hunter.

Another object of the invention is to laminate a color photoreproduction of a goose or duck on to a silhouette type decoy and to so treat the laminate as to render the same waterproof as well as to afford the same proper protection from the elements.

DESCRIPTION OF THE PREFERRED EMBODIMENTS

Figure 1:
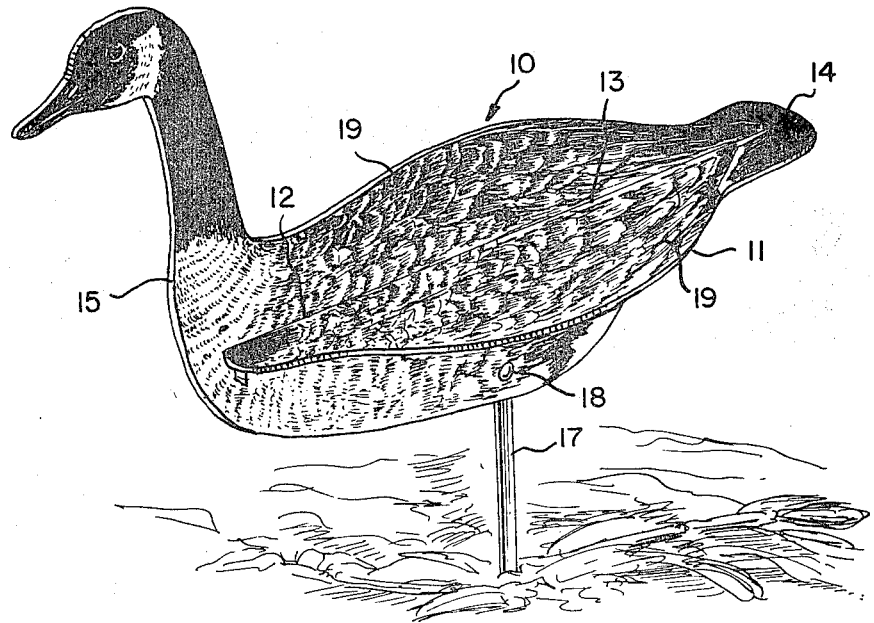
FIG. 1 is a perspective view of a decoy constructed in accordance with the present invention.

Referring now to the drawings, there is shown in FIG. 1 thereof a silhouette type goose decoy indicated generally by the reference numeral 10. While the decoy shown in FIG. 1 is that of a goose in an upright position, it is obvious that the inventive concept of the present invention can likewise be applied to a goose in a feeding position with his neck extended downwardly to simulate a feeding goose. Also, while I have shown and will describe the subject invention as pertaining particularly to a goose decoy, it is obvious the same inventive concept can be applied to form a duck decoy, or for that matter, the principle of the invention can be used in the making of any kind of a decoy where it is desired to simulate a lifelike appearance of any game bird.

Figure 2:
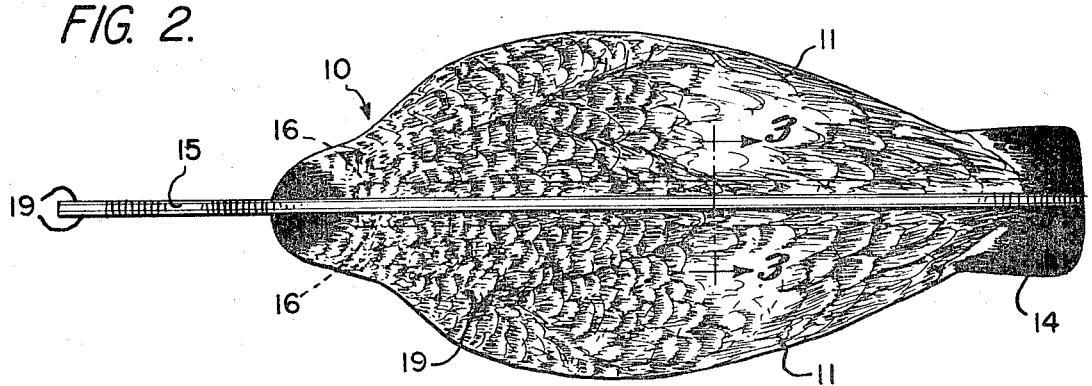
FIG. 2 is a top plan view of the decoy shown in FIG. 1.
Figure 3:
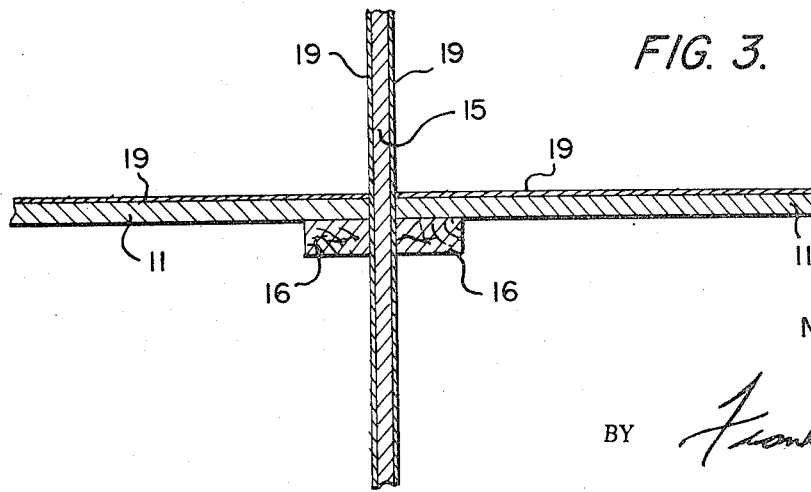
FIG. 3 is an enlarged sectional view taken on line 3—3 of FIG. 2, looking in the direction of the arrows.

The wing members comprise a flat one-piece body having the general configuration and silhouette of a pair of wings. A slot 12 extends from the forward end of the wing member 11 to substantially midway the same, and a similar slot 13 is formed in the body of the decoy and extends from a position substantially midway the body to the tail end thereof. The aforementioned slots permit for the wing member and the body member to be joined to one another by the mere sliding of the parts together to permit the parts to assume the position shown in FIGS. 1 and 2 of the drawings, which show a completed form for a silhouette type decoy. Such a structure is clearly shown in prior U.S. Pat. No. 1,473,612, which patent is herein incorporated by reference. To stabilize the wing section 11 onto the body 15 of the decoy, short supporting members 16 are nailed or otherwise secured to the body 15 and extend under the wing section 11 as clearly shown in FIG. 3 of the drawings. An elongated member 17 constructed of any suitable material such as metal, wood, plastic, etc., is secured to the body of the decoy as by a rivet or other suitable fastener means 18. Preferably the fastener means 18 is anodized so as to render the same dark in color to more closely resemble the remainder of the decoy body color.

Thus, there has been described above the manner in which a goose decoy of the silhouette type can be formed with a minimum of parts and easily assembled for use, and deployed in any manner on land or in shallow water for attracting geese to their deployed area.

As stated previously, it is the main object of the invention to produce a decoy which will appear to be the same as a natural goose, either in a standing or feeding position. To accomplish this, a full size goose in an upright position is mounted following the usual taxidermal preparations, and likewise a full size goose in a feeder position is similarly mounted.

Following the formation of the aforesaid mounts, it will be appreciated that the mounts display all of the color characteristics of a living bird. Then, color photographs are taken of each of the mounted birds. The photographs will include side views of the feeder as well as the upright mounted birds. Also, a color photograph is made of one of the mounts so as to show the the wing sections of the bird, and this photograph of the wing sections can be used for either the feeder or upright decoy. To obtain maximum photoreproduction of the photographed mounts, Kodachrome pictures are made of the parts of the mounts aforesaid and following the taking of the color pictures, a four-color separation is made of each color picture. Following this, two layouts are made, one for the feeder goose and one for the upright position goose. Then, these layouts are printed by the use of a known printing mechanism on Scott Vellum Offset paper with Capital Inks, yellow, red, blue and black employed in the printing process. The production of the printed image of the photographed mounts in the aforesaid manner produces an exact photoreproduction of the goose and when the same is applied to the body and wing portions of the decoy in a manner to be more fully described hereinafter, a lifelike appearance is given the decoy which enhances its ability to lure geese to their deployed area.

Following the formation of the printed photographs in the manner aforesaid, the same are applied to the body and wing portions of the silhouette and held in place thereon by means of a suitable adhesive. Of course, the decoy body and wings will already have been formed to their desired contours so that after the printed photographs are applied thereto the slot 12 in the wings and the slot 13 in the body can then be formed for the purpose set forth above.

After the printed photographs are applied to the decoy body as aforesaid, any excess printed paper appearing beyond the contour of the decoy body and wing portions are trimmed off so as to present a printed surface corresponding to the outline of the decoy parts. As decoys are left exposed to the elements whether they be deployed in a field or in shallow water, it is desirous that the same be protected from the elements. This is accomplished by pointing the edges of the body and wings with a protective paint, preferably black in color so as to more closely harmonize with the color photo-reproduction depicted on the printed paper. The printed paper having thereon the color reproduction is indicated at 19 on the drawings, and referring more particularly to FIG. 3 of the drawings, it will be seen that both sides of the body 15 are provided with the printed paper whereas only the top surface of the wing portions are shown as having the color paper mounted thereon. To protect the printed paper from the elements and to likewise dull the appearance of the color photoreproduction, the decoy parts with the printed paper applied thereto are subjected as by dipping, spraying and the like, to a solution of wax and polyethylene at a somewhat elevated temperature.

Thus, there has been described an improved manner of forming a decoy and for the reasons set forth above, it will be evident that the decoy will present an appearance almost lifelike, which greatly enhances the ability of the decoy to attract their flying species to their deployed area.

The present invention is not to be limited to the illustrative embodiment described herein and shown in the annexed drawings since there are other and additional modifications that are fully apparent and obvious within the spirit and scope of the invention.

Having described my invention, I claim

1. The method of constructing a game bird decoy consisting in:
preparing a silhouette type having body and wings approximating the contour of the bird for which the decoy is intended,
mounting a taxidermally treated game bird of the desired type in upright or feeding position,
taking colored photographs of the mounted game bird, including side wings, showing the body and wings of the game bird,
applying the colored photographs to the corresponding contour of the body and wings of the silhouette, and securing them adhesively in place, then
trimming off excess photograph material from the silhouette 2. The method set forth in claim 1, wherein,
separate colored photographs of the wings of the mount are taken and applied to the silhouette in either of its upright or feeding position.

3. The method set forth in claim 1, including,
the additional steps, following the colored photographs, of the mount, of producing a four-color separation of each color picture, making two layouts thereof, one for the upright mount and one for the feeding mount, then printing said layouts, thus enhancing an exact photoreproduction of the mount.

* * * * *